United States Patent [19]

Sczomak

[11] Patent Number: 4,909,444

[45] Date of Patent: Mar. 20, 1990

[54] POPPET COVERED ORIFICE FUEL INJECTION NOZZLE

[75] Inventor: David P. Sczomak, Troy, Mich.

[73] Assignee: General Motors Corporation, Detroit, Mich.

[21] Appl. No.: 258,903

[22] Filed: Oct. 17, 1988

[51] Int. Cl.⁴ .................. F02M 61/08; F02M 69/04
[52] U.S. Cl. ................... 239/453; 239/459; 239/533.4; 239/533.12
[58] Field of Search ............... 239/453, 454, 455, 456, 239/533.3–533.12

[56] References Cited

U.S. PATENT DOCUMENTS

| | | |
|---|---|---|
| 1,342,486 | 6/1920 | Wolfard . |
| 1,898,325 | 2/1933 | Venn . |
| 2,035,203 | 3/1936 | Smith . |
| 2,063,709 | 12/1936 | Taylor . |
| 2,096,814 | 10/1937 | Laessker . |
| 2,295,081 | 8/1942 | Harvath . |
| 2,521,224 | 9/1950 | Kammer . |
| 2,592,111 | 4/1952 | Bischof . |
| 2,762,654 | 9/1956 | Purchas . |
| 2,901,185 | 8/1959 | Dickey . |
| 3,982,693 | 9/1976 | Hulsing . |
| 4,034,917 | 7/1977 | Bailey . |
| 4,082,224 | 4/1978 | Mangus . |
| 4,096,995 | 6/1978 | Klomp .................. 239/533 B X |
| 4,153,200 | 5/1979 | Fenne . |
| 4,195,783 | 4/1980 | Hulsing .................. 239/533.3 |
| 4,213,564 | 7/1980 | Hulsing .................. 239/88 |
| 4,269,360 | 5/1981 | Kopse .................. 239/533.8 |
| 4,285,471 | 8/1981 | Eblen et al. ............ 239/533.4 |
| 4,509,691 | 4/1985 | Skinner . |
| 4,516,729 | 5/1985 | Füssner et al. . |
| 4,662,338 | 5/1987 | Itoh . |
| 4,693,424 | 9/1987 | Sczomak . |
| 4,750,679 | 6/1988 | Sczomak . |
| 4,758,169 | 7/1988 | Steiger .................. 239/533 B X |

FOREIGN PATENT DOCUMENTS

| | | |
|---|---|---|
| 79037 | 5/1950 | Czechoslovakia . |
| 802968 | 2/1951 | Fed. Rep. of Germany . |
| 2542727 | 3/1977 | Fed. Rep. of Germany . |
| 827877 | 5/1938 | France . |
| 2289756 | 5/1976 | France . |
| 542371 | 1/1942 | United Kingdom . |
| 1521065 | 8/1978 | United Kingdom . |
| 2111124 | 6/1983 | United Kingdom . |

OTHER PUBLICATIONS

Diesel Engine Design Concepts for the 1980's, by K. L. Hulsing, SAW/SP-79/446, #790807, pp. 6 & 7.

Primary Examiner—Andres Kashnikow
Attorney, Agent, or Firm—Karl F. Barr, Jr.

[57] ABSTRACT

In a fuel injection nozzle having an outwardly opening poppet valve that controls the delivery of fuel to an engine combustion chamber, a piston increases the difference between the injection pressure required to initiate opening of the poppet valve and the injection pressure required to fully open the poppet valve. The piston effectively limits opening of the poppet valve during light load engine operation, thereby reducing the rate of injection during light load engine operation and thus enhancing the ability of the engine to operate with low noise, hydrocarbon and nitrogen oxide emissions.

3 Claims, 3 Drawing Sheets

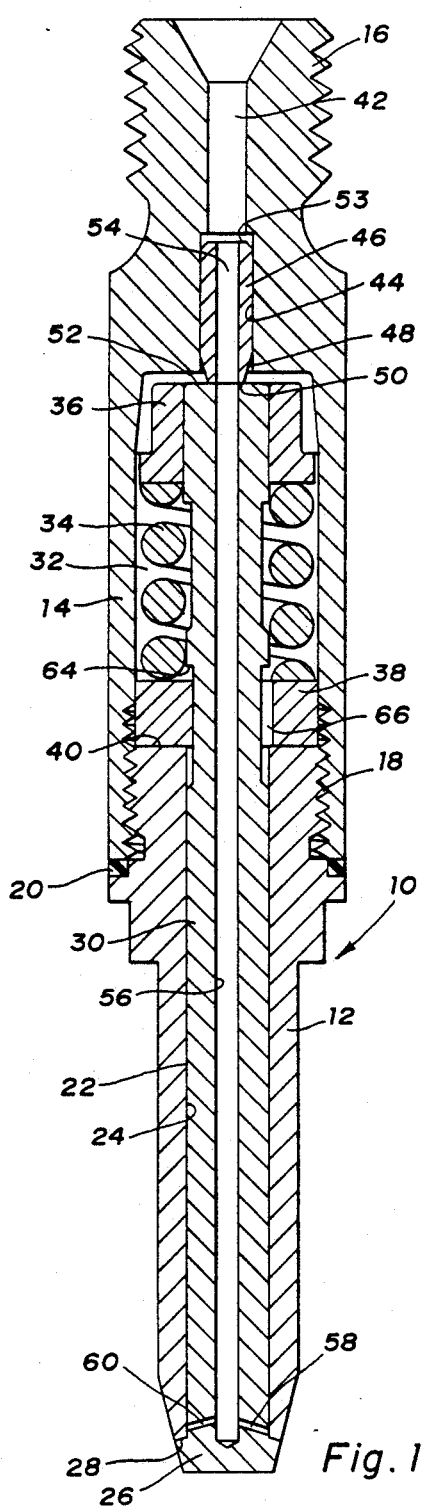
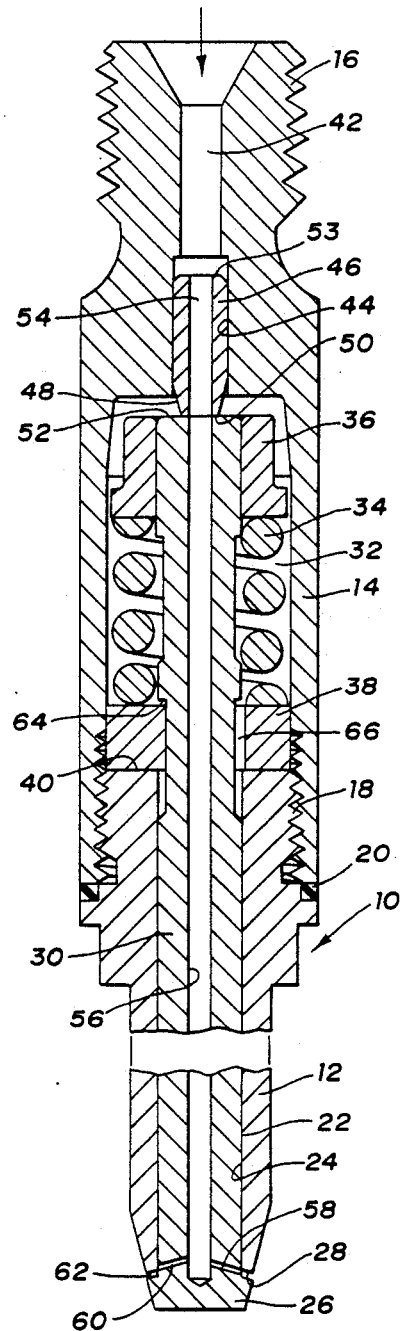
Fig. 1
Fig. 2

POPPET COVERED ORIFICE FUEL INJECTION NOZZLE

TECHNICAL FIELD

This invention relates to a nozzle for delivering fuel to the combustion chamber of an internal combustion engine.

BACKGROUND

In a fuel injection system for a direct injection engine, a pump supplies a measured amount of fuel to a nozzle for delivery directly into the engine combustion chamber.

U.S. Pat. No. 4,693,424 issued Sept. 15, 1987 in he name of D. P. Sczomak describes a fuel injection nozzle having an outwardly opening poppet valve that controls delivery of fuel to the engine combustion chamber. That nozzle allows the engine to operate with lower noise, hydrocarbon and nitrogen oxide emissions than engines with other nozzles.

U.S. Pat. No. 4,750,675 issued June 14, 1988 in the name of D. P. Sczomak describes an improved fuel injection nozzle also having an outwardly opening poppet valve that controls delivery of fuel to the engine combustion chamber. That improved nozzle includes a piston that dampens opening movement of he poppet valve, thereby reducing the initial rate of injection and thus enhancing the ability of the engine to operate with low noise, hydrocarbon and nitrogen oxide emissions.

SUMMARY OF THE INVENTION

This invention provides a further improved fuel injection nozzle also having an outwardly opening poppet valve that controls the delivery of fuel to the engine combustion chamber.

In the improved nozzle provided by this invention, a piston increases the difference between the injection pressure required to initiate opening of the poppet valve and the injection pressure required to fully open the poppet valve. The piston effectively limits opening of the poppet valve during light load engine operation, thereby reducing the rate of injection and thus enhancing the ability of the engine to operate with low noise, hydrocarbon and nitrogen oxide emissions.

The details as well as other features and advantages of two embodiments of this improve nozzle are set forth in the remainder of the specification and are shown in the drawings.

SUMMARY OF THE DRAWINGS

FIG. 1 is an axial sectional view of one embodiment of this improved nozzle, showing the construction of the nozzle.

FIG. 2 is a view similar to FIG. 1, showing the position of the parts when the poppet valve is partially open.

THE PREFERRED EMBODIMENTS

Figure 3:
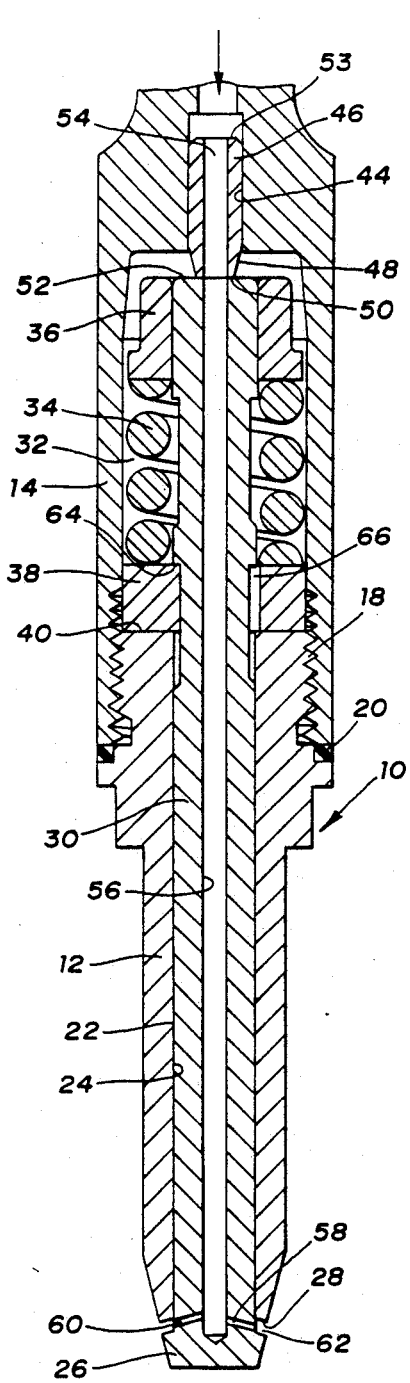
FIG. 3 is a view similar to FIG. 1, showing the position of the parts when the poppet valve is fully open.

Referring first to FIGS. 1-4, a nozzle 10 has a body 12 adapted to be received in an engine cylinder head, and a holder 14 having a fitting 16 that receives fuel from an injection pump. Body 12 and holder 14 are threaded together at 18, and a gasket 20 seal the threaded connection.

A poppet valve 22 is received in the bore 24 of body 12. Valve 22 has a head 26 that engages the lower end 28 of bod 12, and a stem 30 that extends into the chamber 32 formed between body 12 and holder 14. Within chamber 32, a spring 34 is compressed between a spring retainer 36 secured around the upper end of stem 30 and a stop member 38 that rests against the top 40 of body 12.

Holder 14 has a fuel inlet passage 42 that opens into a bore 44. An actuating piston 46 is lapped fit in bore 44. The lower end 48 of piston 46 is tapered or recessed to a face 50 that seals against the top 52 of stem 30.

When the injection pump supplies fuel to nozzle 10, the injection pressure of the fuel acts on the upper face 53 of position 46. Piston 46 transfers the resulting opening force to stem 30 to displace poppet valve 22 against the bias of spring 34. Fuel then flows through inlet passage 42, the passage 54 in piston 46, and the passage 56 in stem 30 to lower and upper sets of orifices 58 and 60, and is discharged across the gap 62 15 (FIGS. 2-4) between poppet valve head 26 and the lower end 28 of body 12.

The area of the upper face 53 of piston 46 and the characteristics of spring 34 are chosen s that, in response to the lower injection pressures of light load engine operation, poppet valve 22 is displaced only far enough to expose the lower set of orifices 58 below the lower end 28 of body 12. By using only the orifices 58 to deliver fuel to the engine combustion chamber during light load engine operation, the rate of injection is reduced and the ability of the engine to operate with low noise, hydrocarbon and nitrogen oxide emissions is enhanced.

In response to the higher injection pressures of heavy load engine operation, poppet valve 22 is displaced until a shoulder 64 on stem 30 engages stop member 38. At that time, both sets of orifices 58 and 60 are exposed below the lower end 28 of body 12 to allow delivery of the fuel required for heavy load engine operation.

It will be appreciated that the same fuel delivery characteristics could be achieved by employing a spring 34 having an increased spring rate. However, an increase in the spring rate would require an increase in the diameter or length of the nozzle. The improved nozzle provided by this invention does not require such an increase in length or diameter.

The opening 66 through stop member 38 is eccentric to the axis of nozzle 10, thereby allowing stop member 38 to be assembled around stem 30 and then, upon insertion into holder 14, to slide laterally under shoulder 64 to act as a stop for poppet valve 22.

Figure 4:
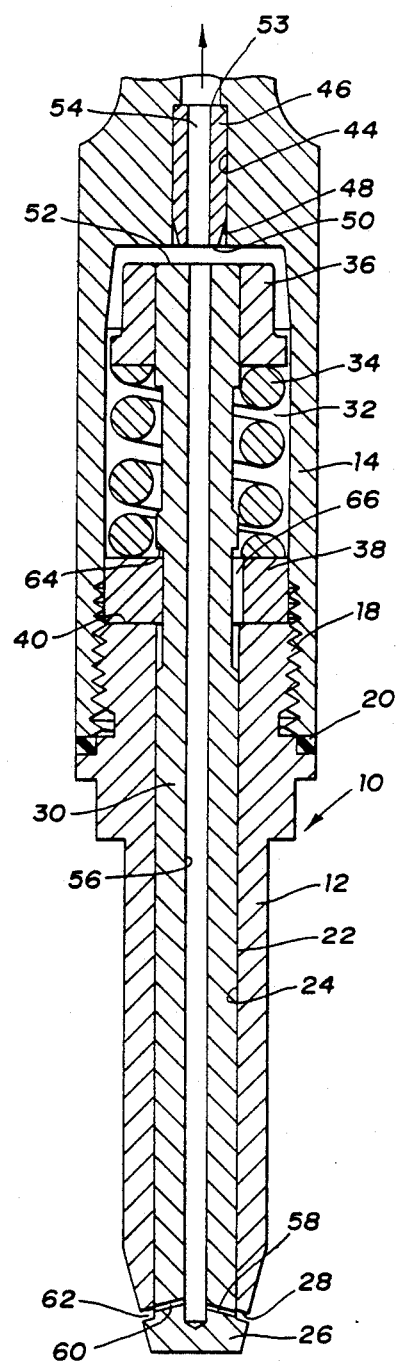
FIG. 4 is a view similar to FIG. 1, showing the position of the parts during closing movement of the poppet valve.

Toward the end of the injection event, the rate of fuel delivery falls off, and spring 34 raises poppet valve 22. Because the diameter of stem 30 is larger than the diameter of piston 46, the pressure in chamber 32 will increase slightly above the pressure in inlet passage 42. The resulting pressure difference causes piston 46 to lift away from stem 30 as shown in FIG. 4, venting the pressure in chamber 32 through the passage 54 in piston 46 to the inlet passage 42.

When the injection pump again supplies fuel to nozzle 10, the piston 46 is pushed and seated against the top 52 of stem 30, as shown in FIG. 1, and the cycle repeats.

Figure 5:
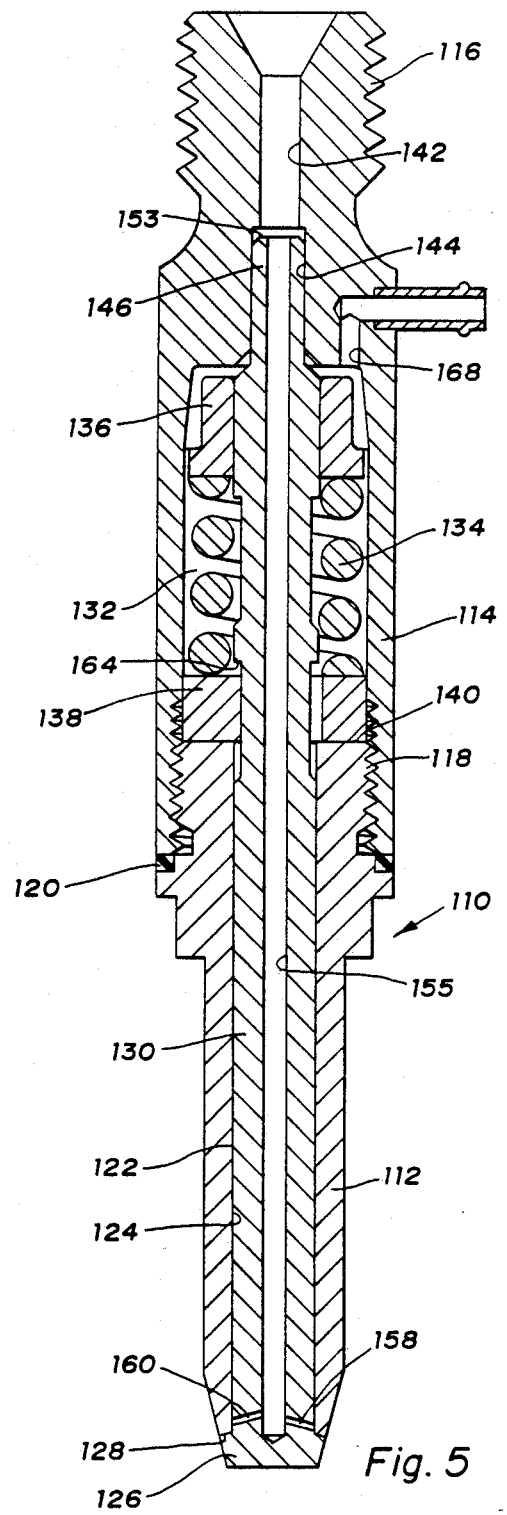
FIG. 5 is an axial sectional view of another embodiment of this improved nozzle.

Referring now to FIG. 5, a nozzle 110 has a body 112 adapted to be received in an engine cylinder head, and a holder 114 having a fitting 116 that receives fuel from an injection pump. Body 112 and holder 114 are threaded together at 118, and a gasket 120 seals the threaded connection.

A poppet valve 122 is received in the bore 124 of body 112. Valve 122 has a head 126 that engages the lower end 128 of body 112, and a stem 130 that extends into the chamber 132 formed between body 112 and holder 114. Within chamber 132, a spring 134 is compressed between a spring retainer 136 secured around the upper end of stem 130 and a stop member 138 that rests against the top 140 of body 112.

Holder 114 has a fuel inlet passage 142 that opens into a bore 144. An actuating piston 146 formed as an extension of valve stem 130 is received in bore 144.

When the injection pump supplies fuel to nozzle 110, the injection pressure of the fuel acts on the upper face 153 of piston 146. Piston 146 transfers the resulting opening force to stem 130 to displace poppet valve 122 against the bias of spring 134. Fuel then flows through inlet passage 142, the passage 155 in piston 146 and stem 130 to lower and upper sets of orifices 158 and 160, and is discharged across the gap between poppet valve head 126 and the lower end 128 of body 112.

The area of the upper face 153 of piston 146 and the characteristics of spring 134 are chosen so that, in response to hhe lower injection pressures of light load engine operation, poppet valve 122 is displaced only far enough to expose the lower set of orifices 158 below the lower end 128 of body 112. By using only the orifices 158 to deliver fuel to the engine combustion chamber during light load engine operation, the rate of injection is reduced and the ability of the engine to operate with low noise, hydrocarbon and nitrogen oxide emissions is enhanced.

In response to the higher injection pressures of heavy load engine operation, poppet valve 122 is displaced until a shoulder 164 on stem 130 engages stop ember 138. At that time, both sets of orifices 158 and 160 are exposed below the lower end 128 of body 112 to allow delivery of the fuel required for heavy load engine operation.

Any fuel leakage around piston 146 enters chamber 132 and is vented through a passage 168.

Toward the end of the injection event, the rate of fuel delivery falls off, and spring 134 raises poppet valve 122. Because the diameter of stem 130 is larger than the diameter of piston 146, the volume in chamber 132 will decrease as the poppet valve 122 closes. Any fuel displaced from chamber 132 is vented through passage 168.

What is claimed:

1. A fuel injection nozzle having a body with an axial bore, a poppet valve having a stem received in said bore and a head adapted to engage the end of said body, a spring biasing said stem to engage said valve head with the end of said body, and a holder secured to said body, said holder having a fuel inlet passage, wherein said passage opens into a piston bore formed in said holder, and an actuating piston is received in said piston bore, said piston having a first face exposed to the injection pressure of fuel in said inlet passage and a second face adapted to act against the end of said stem, said piston being adapted to transfer said injection pressure to said stem to displace said poppet valve against the bias of said spring, whereby fuel flows through said inlet passage and through passage means in said piston and said stem to a plurality of orifices opening through said stem from said passage means and is discharged from said orifices across a gap formed between said valve head and the end of said body, and wherein the area of said first face of said piston exposed to said injection pressure and the characteristics of said spring are chosen so that, in response to the lower injection pressures of light load engine operation, said poppet valve is displaced only far enough to allow fuel to be discharged from a portion of said orifices, and that, in response to the higher injection pressures of heavy load engine operation, said poppet valve is displaced far enough to allow fuel to be discharged from all said orifices, whereby the rate at which fuel is discharged during light load engine operation is lower than the rate at which fuel is discharged during heavy load operation.

2. A fuel injection nozzle having a body with an axial bore, a poppet valve having a stem received in said bore and a head adapted to engage the end of said body, a spring biasing said stem to engage said valve head with the end of said body, a holder secured to said body, said stem extending into a chamber formed between said body and said holder, said holder having a fuel inlet passage, wherein said passage opens into a piston bore formed in said holder, and an actuating piston is received in said piston bore, said piston having a face exposed to the injection pressure of fuel in said inlet passage, said piston extending into said chamber and having another face adapted to seal against the end of said stem, said piston being adapted to transfer said injection pressure to said stem to displace said poppet valve against the bias of said spring, whereby fuel flows through said inlet passage and through passage means in said piston and said stem to a plurality of orifices opening though said stem from said passage means and is discharged from said orifices across a gap formed between said valve head and the end of said body, wherein the area of the face of said piston exposed to said injection pressure and the characteristics of said spring are chosen so that, in response to the lower injection pressures of light load engine operation, said poppet valve is displaced only far enough to allow fuel to be discharged from a portion of said orifices, and that, in response to the higher injection pressures of heavy load engine operation, said poppet valve is displaced far enough to allow fuel to be discharged from all said orifices, whereby the rat at which fuel is discharged during light load engine operation is lower than the rate at which fuel is discharged during heavy load operation, and wherein the area of the face of said piston exposed to said injection pressure is larger than the area of the face of said piston adapted to seal against the end of said stem, whereby when said spring moves said poppet valve to reengage said valve head with the end of said body, said piston lifts away from the end of said stem and vents the pressure in said chamber through said passage means in said piston to said inlet passage.

3. A fuel injection nozzle having a body with an axial bore, a poppet valve having a stem received in said bore and a head adapted to engage the end of said body, a spring biasing said stem to engage said valve head with the end of said body, a holder secured to said body, said stem extending into a chamber formed between said body and said holder, said holder having a fuel inlet passage, wherein said passage opens into a piston bore formed in said holder and said stem includes an actuating piston portion received in said piston bore, said piston having a face exposed to the injection pressure of fuel in said inlet passage, said piston being adapted to transfer said injection pressure to said stem to displace said poppet valve against the bias of said spring, whereby fuel flows through said inlet passage and through passage means in said stem to a plurality of orifices opening though said stem from said passage means and is discharged from said orifices cross a gap formed between said valve head and the end of said body, wherein the area of said face of said piston and the characteristics o said spring are chosen so that, in response to the lower injection pressures of light load engine operation, said poppet valve is displaced only far enough to allow fuel to be discharged from a portion of said orifices, and that, in response to the higher injection pressures of heavy load engine operation, said poppet valve is displaced far enough to allow fuel to be discharged from all said orifices, whereby the rate at which fuel is discharged during light load engine operation is lower than the rate at which fuel is discharged during heavy load operation, and wherein said nozzle has a passage opening from said chamber whereby the pressure in said chamber is vented when said spring moves said poppet valve to reengage said valve head with the end of said body.

* * * * *